(No Model.) 4 Sheets—Sheet 1.
J. A. SALADIN.
APPARATUS FOR COOLING AND IMPREGNATING AIR AND OTHER GASES.
No. 302,163. Patented July 15, 1884.
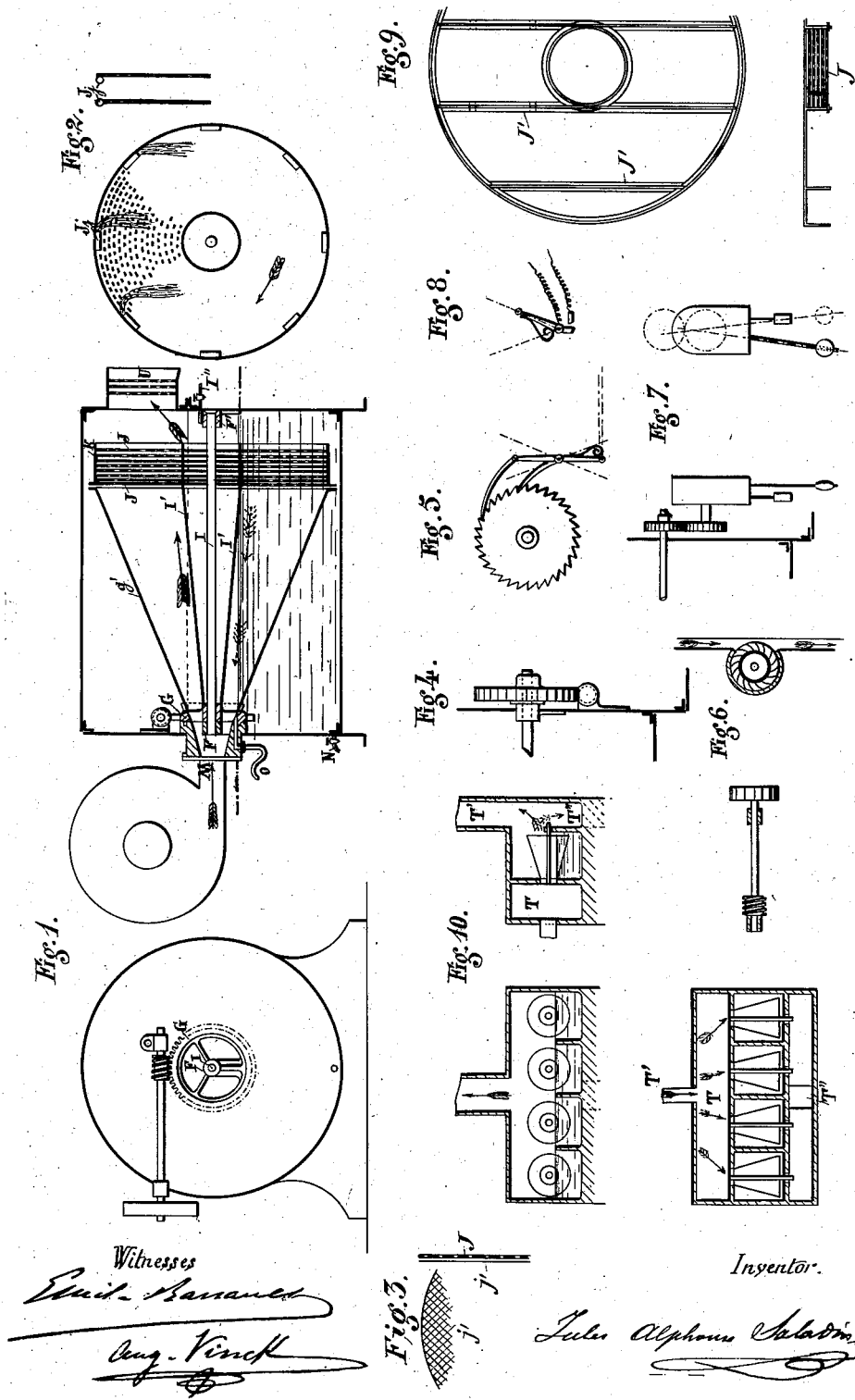

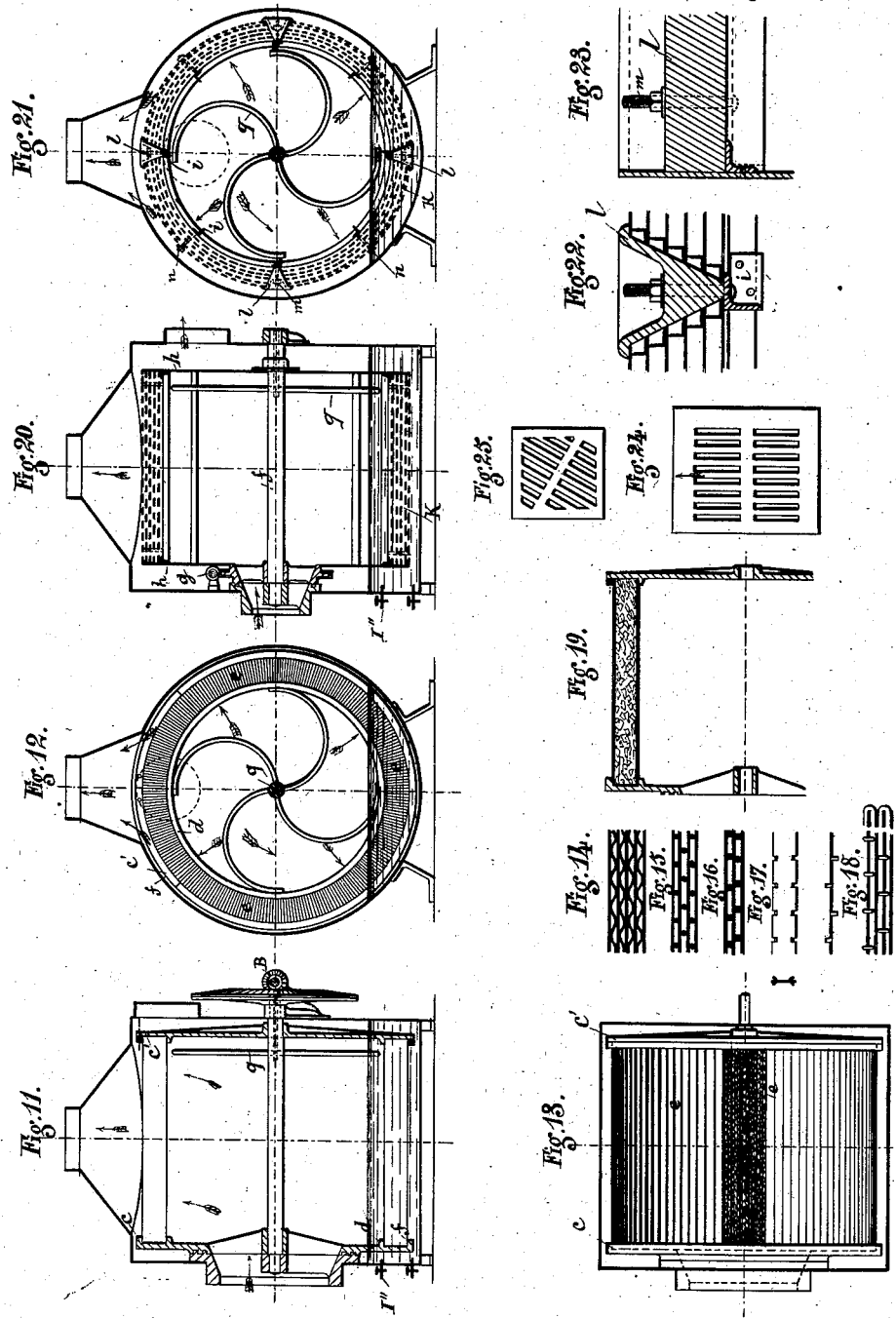

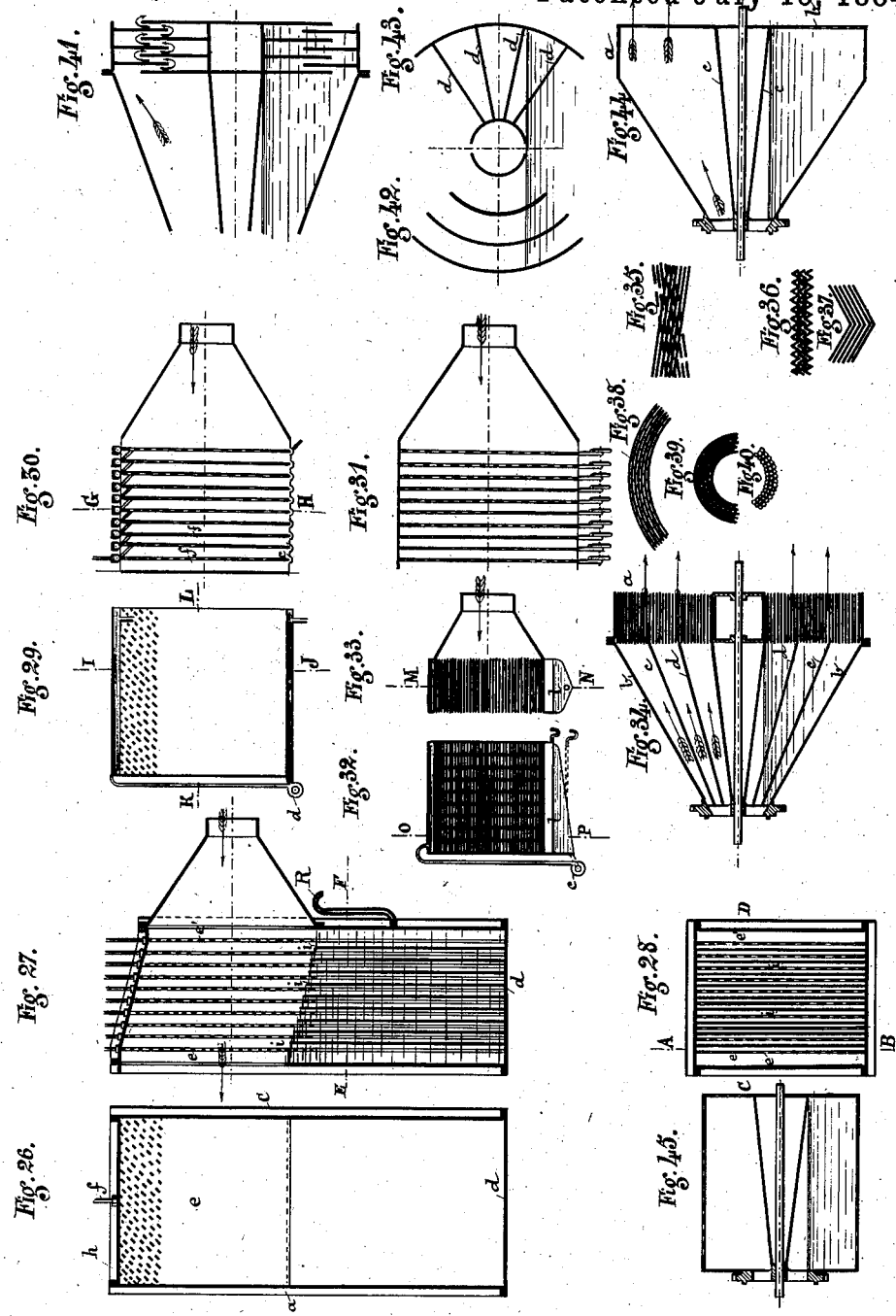

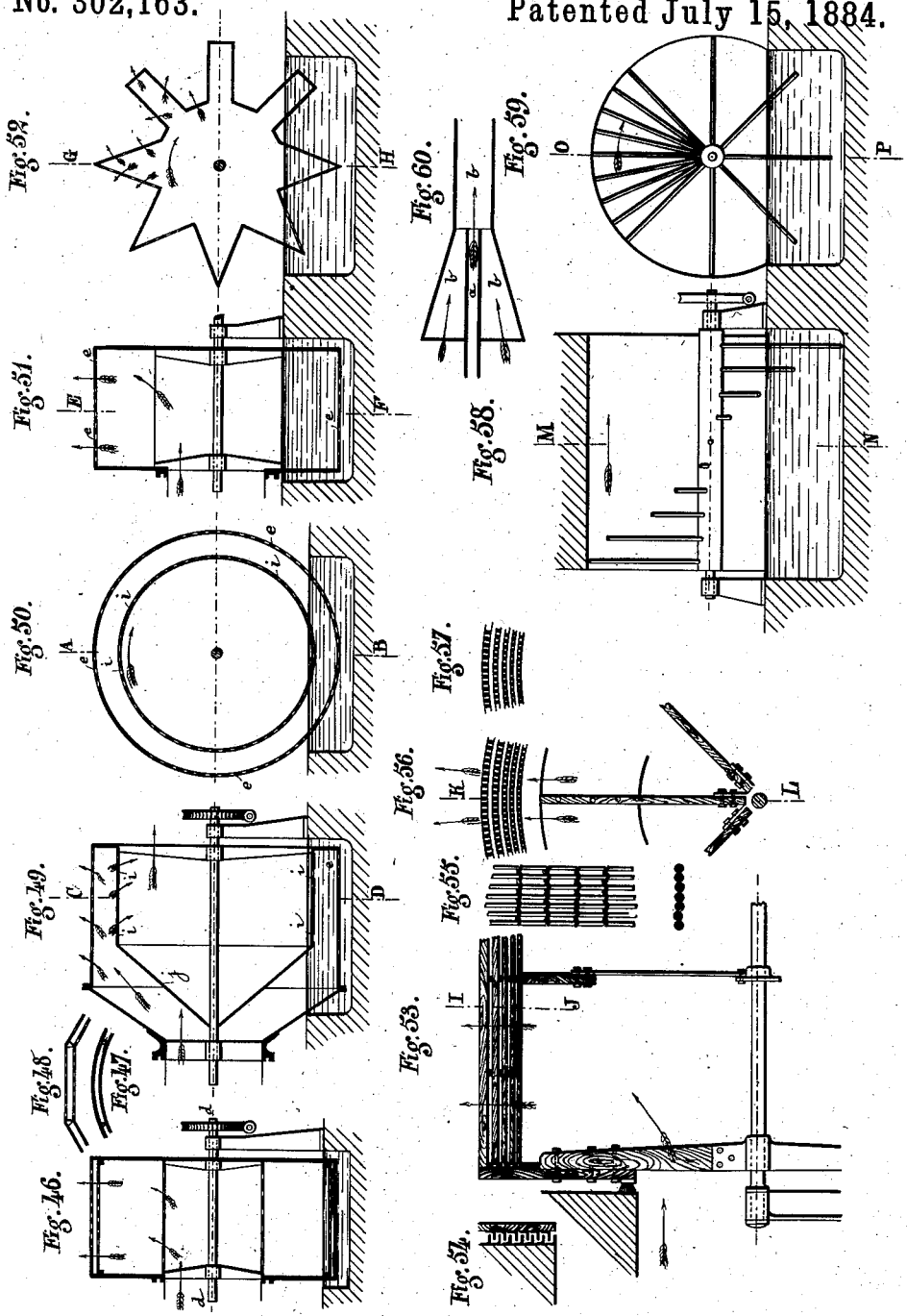

UNITED STATES PATENT OFFICE.

JULES ALPHONSE SALADIN, OF NANCY, MEURTHE-ET-MOSELLE, FRANCE.

APPARATUS FOR COOLING AND IMPREGNATING AIR AND OTHER GASES.

SPECIFICATION forming part of Letters Patent No. 302,163, dated July 15, 1884.

Application filed June 4, 1884. (No model.) Patented in France January 22, 1883, No. 153,183; in Belgium March 30, 1883, No. 60,921, and in England March 30, 1883, No. 1,614.

*To all whom it may concern:*

Be it known that I, JULES ALPHONSE SALADIN, a citizen of France, residing at Nancy, in the department of Meurthe-et-Moselle, have invented a new and useful Improvement in Apparatus for Cooling and Impregnating Air and other Gases and for other purposes, of which the following is a specification.

The invention consists in a new form of apparatus in which air or other gas may be brought into contact with a liquid in a state of division, in order to change the temperature of the gas or liquid by the contact to evaporate the liquid or impregnate the gas with the same or with substances dissolved therein, for the purpose of supplying cold or warm air for ventilation, or air impregnated with anesthetics or disinfectants for medical or sanitary uses, of carbureting air or gas for illumination or heating, or for other purpose to which the said apparatus is or may be adapted. In this new apparatus the air or gas is forced through a series of perforated or slotted plates, kept moist with the liquid by rotating partly in and partly out of the liquid, or by giving to the said plates a movement of reciprocation, or by causing the liquid to circulate over fixed plates.

The accompanying drawings represent several examples of each kind of apparatus.

Figure 1 illustrates in elevation and section one form of the apparatus with rotary plates; Figs. 2 and 3, appliances that may be used in connection with the same; Figs. 4 to 8, different apparatus for revolving the plates; Fig. 9, a special construction for use with very large plates, and Fig. 10 an arrangement for treating large bodies of air, views in longitudinal, cross, and horizontal section being given; Figs. 11, 12, and 13 are respectively longitudinal and cross section and plan of another form of rotary apparatus, and Figs. 14 to 18 detail views illustrating modifications. Fig. 19 is a partial view in longitudinal section of a third form. Figs. 20 and 21 are longitudinal and cross section of a fourth form, and Figs. 22 to 25, detail views connected therewith. Figs. 26, 27, and 28 represent an apparatus in which the perforated or slotted plates are reciprocated. Figs. 29, 30, and 31 illustrate an apparatus in which the liquid is circulated, the plates remaining stationary; and Figs. 32 and 33 show another form of the same. Fig. 34 shows a fifth form of apparatus with rotatory plates. Figs. 35 to 40 are detail views of modifications. Figs. 41 to 45 illustrate modifications which may be made in the rotatory part, which in its general features is like that of Fig. 1. Figs. 46 to 59 illustrate simplified rotatory apparatus, and Fig. 60 shows an ejector that may be used with the apparatus.

In a water-tight receptacle or drum of sheet-iron the series of plates J are supported by means of the shaft I, to which they are secured by means of the concentric cones $g'$ and $I'$ and the worm-gear G. The plates are fixed to the wide ring K, which surrounds them, and is bolted to the enlarged end of the cone $g'$, and the said plates are further fastened to the cylindrical extension of the enlarged end of the cone $I'$, which enters the openings in the centers of the plates. Between this cylindrical extension and the shaft I a number of holding or supporting disks are interposed. The shaft I is journaled in bearings F F' at the opposite ends of the receptacle. The shaft is revolved by an endless screw engaging the worm G, and driven by a pulley. (See also Fig. 4.) The liquid (water for example) runs in at the pipe I″ and escapes by the outflow $o$, after having passed through the lower part of the perforated plates J and of the cone $g'$ in the direction indicated by the dotted arrows. The air to be cooled is forced, by a fan-blower, M, or other suitable means, into and through the annular space between the cones, as indicated by the solid arrows. It passes through the perforations in the plates J and comes into contact with the liquid thereon. The revolution of the partly-submerged plates keeps the part above the liquid through which the air passes always moist. The cooled air escapes through the perforated plates in the outlet-passage U. In order to increase the quantity of liquid carried up by the plates, these or one or more of them may be provided at the rim with little buckets $j$, as shown in Fig. 2, or they may be covered with woven-wire fabric $j'$, Fig. 3.

The series of disks J may be replaced by wood, cork, coke, brick, pumice-stone or other material adapted to take up and to subdivide the liquid. Such material may be in small pieces confined between two perforated plates.

Instead of turning the shaft I by worm-gearing, it may be revolved by a pawl and ratchet, (see Fig. 5,) a small turbine, Fig. 6, a clock-work, Fig. 7, or a pawl and ratchet in which the pawl is moved by an electro-magnet, Fig. 8, or by other suitable motor.

Large plates can be made up (see Fig. 9) by fastening sections J to and between cross-bars J'. In Fig. 10 a compressed air-chamber, T, communicates with a series of the apparatus (such as shown in Fig. 1 or in other figures) placed in chambers of masonry, and these apparatus all deliver the cooled air into a common chamber, whence it passes by the flues T' and T'', as may be desired.

In the apparatus of Figs. 11, 12, and 13 a series of plates, $e$, placed close together side by side, are confined at the ends by the heads $c\ c'$ between the flanges $d\ f$, near the edges of said heads. Water or other liquid is admitted by the pipe I'', and is removed from the inside of the rim of plates $e$ by the curved pipes $q$, which scoop up the liquid and deliver it through the shaft I, which is perforated at one end, as indicated in dotted lines at the right of Fig. 11. The drum is revolved to the left, as indicated in Fig. 12, by means of the bevel-gears B. The air moves in the direction of the arrows, passing between the plates $e$, which are kept constantly wet by the liquid in which the lower part of the drum's periphery is immersed.

To increase the surface, and to hold the plates apart, corrugated strips, Fig. 14, or pins, rods, or blocks, round, Fig. 15, or square, Fig. 16, may be placed between the strips, or projections may be formed, or the strips themselves, Fig. 17, or short studs may be inserted through holes in the plates, Fig. 18, or other devices may be used.

Instead of providing the drum with a slotted or perforated periphery in the manner just described, brick, coke, and like material in small fragments may be confined between two perforated cylinders of metal, as shown in Fig. 17, or a series of perforated cylinders arranged one outside the other may be used, as shown in Figs. 20 and 21. The perforated cylinders K are made of sections, which at the ends abut against and are held in place by the wedge-shaped cross-pieces $l$. These wedge-shaped pieces are bolted to the flanged cross-bars $i$, which are bolted at the ends to the heads $h$. Strips separate the overlying sections, being interposed, as shown in Fig. 22. Bolts $n$ fasten the sections between the blocks to other cross-bars $i$. The perforations in the cylinder-sections K may be of any desired shape. They may be slots and run lengthwise of the sections, as shown in Fig. 24, or, better, obliquely thereto, as shown in Fig. 25.

In the apparatus of Figs. 26, 27, and 28 the perforated plates $e$ are moved up and down into and out of the liquid in the chamber $d$, divided by partitions $i$ into as many compartments as there are plates $e$. These partitions, and consequently the compartments, are of different depths. The water is introduced into the deepest one, and after passing successively through all escapes by the overflow R. Fig. 26 is a section on line A B, Fig. 28; Fig. 27 is a section on line C D, same figure, and Fig. 28 a section on line E F, Fig. 27.

The apparatus of Figs. 29, 30, and 31 has stationary perforated plates $f$, over which the water trickles, the air passing through in the direction of the arrow. Above each plate is a pipe, which delivers the water onto the plate. The lower edges of the plates dip into the grooves $c$, which collect and carry off the liquid to be raised by the rotary pump $d$ into the pipe on top, in order that it may trickle over the next plate in the series.

Fig. 29 is a section on line G H of Fig. 30, which is a section on line I J of Fig. 29. Fig. 31 is a section on line K L of Fig. 29.

Instead of a series of upright perforated plates, a series of flat horizontal plates set close together may be used. An apparatus of this kind is shown in Figs. 32 and 33, the former being a section on line M N of the latter, which is a section on line O P of Fig. 32. The water, after running over the plates, is collected in the receptacle $l$, whence it is returned to the top by the centrifugal pump $c$.

In Fig. 34 a drum to be used instead of that of Fig. 1 is represented. The plates are flat rings secured at the enlarged ends of the cones $b\ c\ d$. They may be crossed with other plates, as indicated in Fig. 35, or corrugated, Fig. 36, or bent in larger zigzags, Fig. 37, or separated by cross-pieces, Fig. 38, or interposed corrugated strips, Fig. 39, or by a series of pins, Fig. 40.

In Fig. 41 the enlarged end of the cone is closed by overlapping plates leaving a tortuous passage between, through which the air passes, as indicated by the arrows. When more than two cones are used, one or more of the intermediate cones may be perforated, as shown in Fig. 42. Division and strengthening plates $d$ may be placed longitudinally between the cones. In Fig. 44 the part $a$ of the outer cone is perforated as well as the end plate, $b$, which is fastened to the enlarged end of cone $c$. In Fig. 45 a perforated cylinder is used in place of the outer cone.

The different forms of apparatus in Figs. 46 to 52 will be readily understood without further description. The liquid is not removed from inside the perforated drums, as in the apparatus of Figs. 11 and 20; but it is evident that the curved pipes $q$ could be used.

In Figs. 53 and 56 a series of slats are placed close together and secured to the arms of a wheel. Fig. 53 is a section on line K L of Fig. 56, and the latter a section on line I J of the former. The slats may be woven together, as shown in Fig. 55.

In Figs. 58 and 59, which are sections on line M N and O P of the other figures, there are a series of spokes, which revolve, and at each revolution dip into the liquid and then are exposed to the current of air. They may be wrapped with flannel or other cloth.

It is evident that the apparatus, besides being used for cooling air, may be use for various other purposes. It may, for example, be used to carburet air or gas, the water being replaced by a light hydrocarbon—such as gasoline or naphtha. If it is desired to mix the carbureted air or gas with other air or gas, an ejector of ordinary form, as shown in Fig. 60, is or may be employed.

Having now fully described my said invention and the manner of carrying the same into effect, what I claim is—

1. The new system of apparatus for bringing continuously air or other gas into contact with water or other liquid in a finely-divided condition by forcing the air or gas through a series of perforated plates movable into or out of the liquid, or disposed in such a way that the whole being stationary the liquid and gas alone are moved, this new system being applicable to the evaporation of a liquid, to ventilation by hot or cold air, to the disinfecting of unwholesome places, and to like purposes, substantially as described.

2. The special form of apparatus (shown by way of example in Figs. 1 to 26) to obtain the ends stated, the same comprising a drum provided with rotatory plates, a liquid-receptacle, and inlet and outlets, the gas entering by the center of the apparatus and escaping only after passing through the perforated plates kept moist by turning in the said liquid, substantially as described.

3. The dispositions shown by way of example in Figs. 26, 27, and 28, in which the perforated plates are reciprocated, the enveloping-case remaining stationary, substantially as described.

4. The dispositions shown by way of example in Figs. 29 to 33, in which all the organs remain stationary and the liquid and gas alone are put in movement in order to effect the necessary contact between the liquid and gas, substantially as described.

5. The dispositions shown in Figs. 46 to 59 for the purpose of increasing the capacity by enlarging the perforated surface or diminishing the price of the apparatus by simplifying the construction, substantially as described.

In testimony whereof I have hereunto set my hand in the presence of two subscribing witnesses.

JULES ALPHONSE SALADIN.

Witnesses:
 EMILE BARRAULT,
 AUG. VINCK.